(12) United States Patent
Pradier et al.

(10) Patent No.: US 8,579,373 B2
(45) Date of Patent: Nov. 12, 2013

(54) DEVICE FOR ADJUSTING THE LENGTH OF THE SEAT BASE FOR A MOTOR VEHICLE SEAT AND SEAT COMPRISING SUCH A DEVICE

(75) Inventors: Bernard Pradier, Saint Michel sur Orge (FR); Jérôme Planson, Angerville (FR)

(73) Assignee: Faurecia Sièges d'Automobile, Nanterre (FR)

( * ) Notice: Subject to any disclaimer, the term of this patent is extended or adjusted under 35 U.S.C. 154(b) by 86 days.

(21) Appl. No.: 13/088,549

(22) Filed: Apr. 18, 2011

(65) Prior Publication Data
US 2011/0254335 A1    Oct. 20, 2011

(30) Foreign Application Priority Data

Apr. 20, 2010  (FR) .................................. 10 53021
Aug. 11, 2010  (FR) .................................. 10 56550

(51) Int. Cl.
*A47C 7/50*   (2006.01)
(52) U.S. Cl.
USPC .................................................. 297/284.11
(58) Field of Classification Search
USPC ........... 297/284.11, 70, 76, 84, 85 M, 423.19, 297/423.2, 311, 423.36
See application file for complete search history.

(56) References Cited

U.S. PATENT DOCUMENTS

| | | | |
|---|---|---|---|
| 3,738,706 A * | 6/1973 | Caldemeyer | 297/410 |
| 3,856,252 A * | 12/1974 | Regis | 248/600 |
| 5,560,681 A | 10/1996 | Dixon et al. | |
| 5,829,839 A * | 11/1998 | Wilkerson et al. | 297/411.36 |
| 6,926,366 B2 * | 8/2005 | Wolters | 297/423.36 |
| 7,434,887 B1 * | 10/2008 | Hsien | 297/411.36 |
| 7,753,446 B2 * | 7/2010 | Kubler et al. | 297/284.11 |
| 7,878,596 B2 * | 2/2011 | Brunner et al. | 297/410 |
| 2001/0004164 A1 * | 6/2001 | Mattsson | 297/284.11 |
| 2005/0102755 A1 * | 5/2005 | Jacobs et al. | 5/624 |
| 2006/0103216 A1 * | 5/2006 | Hoekstra et al. | 297/410 |
| 2007/0102985 A1 * | 5/2007 | Taniguchi et al. | 297/423.36 |

(Continued)

FOREIGN PATENT DOCUMENTS

| | | |
|---|---|---|
| CN | 1822967 | 8/2006 |
| CN | 1962310 | 5/2007 |

(Continued)

OTHER PUBLICATIONS

French Search Report issued in FR10/53021 on Dec. 1, 2010.

(Continued)

*Primary Examiner* — David Dunn
*Assistant Examiner* — Richard Lowry
(74) *Attorney, Agent, or Firm* — Vedder Price PC

(57) ABSTRACT

A seat base length adjustment device including a seat nose plate assembled on a carriage movable with respect to the seating frame, means for slidably guiding the carriage, and means for maintaining the carriage in position with respect to said frame. The sliding guide means comprises a guide rail located in a middle portion of the carriage, the carriage supports a toothed wheel, rotatably assembled on the carriage along an axis perpendicular to the seating frame and to the sliding direction, and meshing with a rack arranged close to the guide rail, and the means for maintaining the carriage in position comprises a lock acting on the rotation of the toothed wheel.

17 Claims, 4 Drawing Sheets

(56) References Cited

U.S. PATENT DOCUMENTS

| | | |
|---|---|---|
| 2007/0108817 A1* | 5/2007 | Lee et al. ............... 297/284.11 |
| 2007/0145803 A1* | 6/2007 | Kopetzky et al. ............ 297/410 |
| 2008/0174162 A1* | 7/2008 | Becker et al. ............... 297/311 |
| 2009/0033134 A1* | 2/2009 | Hofmann et al. ............ 297/311 |
| 2009/0085387 A1* | 4/2009 | Thiel et al. ............... 297/284.11 |
| 2009/0152920 A1* | 6/2009 | Gumbrich et al. ......... 297/284.1 |

FOREIGN PATENT DOCUMENTS

| | | |
|---|---|---|
| DE | 19826823 | 8/1999 |
| DE | 19943707 A1 | 3/2001 |
| DE | 102004030363 A1 | 1/2006 |
| DE | 202006001969 U1 | 6/2007 |
| DE | 202007002803 U1 | 7/2007 |
| DE | 102006018353 | 6/2008 |
| DE | 102007049865 A1 | 7/2008 |
| DE | 102008006547 A1 | 8/2009 |
| DE | 102008049923 | 8/2009 |
| DE | 102009012776 | 9/2010 |
| DE | 102009018754 | 9/2010 |
| EP | 1574428 A1 | 9/2005 |

OTHER PUBLICATIONS

French Search Report issued in FR10/53550 on Mar. 11, 2010.
Office Action dated Nov. 2, 2012 corresponding to Chinese application No. 201110100969.2, and translation.
Office Action dated Oct. 26, 2012 corresponding to German Application No. 22586DE.
Brief Summary of contents of German documents cited in Office Action dated Oct. 26, 2012 corresponding to German Application No. 22586DE.

* cited by examiner

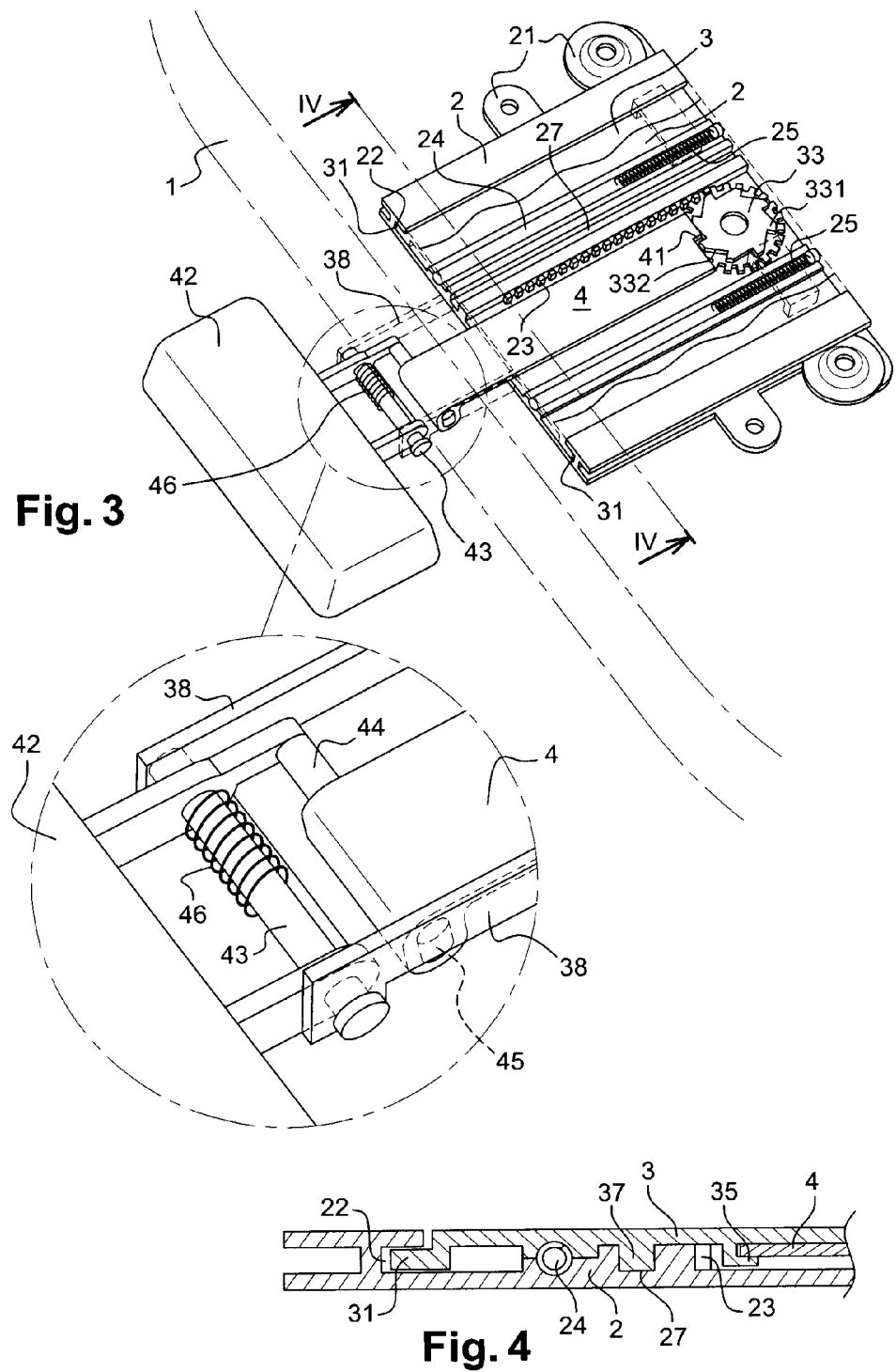

DEVICE FOR ADJUSTING THE LENGTH OF THE SEAT BASE FOR A MOTOR VEHICLE SEAT AND SEAT COMPRISING SUCH A DEVICE

BACKGROUND OF THE INVENTION

1. Field of the Invention

The present invention relates to motor vehicle seats which comprise a seat base that can be adjusted to the user's morphology. Such seats enable to adapt the length provided by the seat base to the user's leg length, to provide a better comfort by supporting the thighs all the way to the knee bend.

2. Discussion of Prior Art

For this purpose, known seats comprise a seat base in which only the central portion of the seat cushion has an adjustable length, the stuffed lateral sides of the seat base remaining fixed. To be able to adjust this cushion length, it is known to move only the front portion of the cushion, or seat nose, backwards or forwards.

Known systems comprise a seat nose support plate assembled to slide backwards or forwards on a seating frame front crosspiece. The plate is assembled on a carriage sliding in a guide rail placed on the crosspiece.

DE19826823 discloses an adjustment system in which the opposite edges of the carriage are guided in lateral grooves of the guide rail. Said grooves are thus very distant from each other, especially as compared with their length. The system described in this document aims at avoiding for the sliding carriage supporting the seat nose to block by buttressing between the guide rail edges, due to the small length of the guide rail as compared with its width. This system uses a set of four toothed wheels meshing with one another, rotatably assembled on the carriage and aligned transversely to the sliding direction. The two end toothed wheels, which have the same dimension, also mesh with racks respectively provided on each edge of the guide rail. Thus, the displacements of the carriage are necessarily identical on both sides and the carriage thus cannot get stuck by buttressing in the guide rail. The locking in position is ensured by a pivoting lock located towards the back and engaging with one of the intermediary toothed wheels.

A disadvantage of such a system especially is the relatively large number of wheels, required to avoid the above-mentioned buttressing. Further, the unlocking requires operating the pivoting lock located towards the back with complementary control means enabling to control the pivoting of the lock from an offset driving member accessible to the user, which complicates the system manufacturing.

DE-A-102004030363 describes a system for setting the seat base length which comprises a carriage (1) slidably driven by a motor (27) which drives a pinion meshing with a rack (21) fixed on the seat frame. The carriage is guided on guide rails located laterally on either side of the seat.

The present invention especially aims at solving the above-discussed problems. It more specifically aims at providing a system which is easier to form and to use, while suppressing buttressing risks. It also aims at enabling to keep the largest possible seat nose cushioning thickness, by limiting to a minimum the thickness of the adjustment system. It further aims at enabling to use the largest possible number of common parts for a manually-operated adjustment system or a motor-driven adjustment system.

SUMMARY OF THE INVENTION

To achieve these objects, the present invention provides a device for adjusting the seat base length for a motor vehicle seat, comprising a seat nose plate assembled on a carriage movable with respect to the seating frame, means for slidably guiding the carriage, and means for maintaining the carriage in position with respect to said frame.

According to the present invention, the adjustment device is characterized in that the sliding guide means comprise a guide rail located in a middle portion of the carriage, the carriage supports a toothed wheel rotatably assembled on the carriage on an axis perpendicular to the seating frame and to the sliding direction, and meshing with a rack arranged close to the guide rail, and the means for maintaining the carriage in position comprise a lock acting on the rotation of the toothed wheel.

Thus, the use of a guide rail which is narrow with respect to its length and located in a middle portion of the carriage suppresses almost any risk for the carriage to get stuck by buttressing in the guide rail. The loads tending to immobilize the translation of the carriage, transmitted between the toothed wheel and the rack, are also exerted in a middle portion and do not risk generating a buttressing effect. The number of parts, and thus the cost, are decreased and, as will be better seen hereafter, many of the parts can be indifferently used in the manually-operated version and in the electric control version.

According to a specific configuration, the edges of the carriage are also guided in lateral grooves, which essentially only provide a guiding in the vertical plane, to avoid for the carriage edges to move away from the frame, but without taking part in the guiding in the horizontal plane, and thus without risking to cause a buttressing.

According to another specific configuration, return springs are arranged between the carriage and the guide rail on either side of the rack, to push the carriage towards the front of the seat base. These springs facilitate the seat nose adjustment manipulation by acting in such a way as to always push towards the front, thus avoiding for the user to have to pull the seat nose towards the front to increase the seat base length. Further, since the springs are placed on the guide rail edges, they contribute to balancing the sliding load and avoid a jamming.

As a variation, a spiral return spring may be assembled between the toothed wheel and the carriage, to exert on the toothed wheel a torque capable of pushing the carriage towards the front of the seat base by meshing of the toothed wheel with the rack.

According to a preferred configuration, the lock is slidably assembled on the carriage in the sliding direction of the carriage and has a notched locking end cooperating with the teeth of the toothed wheel.

Preferably, the teeth of the toothed wheel cooperating with the end of the lock are specific teeth different from the teeth cooperating with the rack.

According to a specific embodiment, the end of the lock and said specific teeth are made to form a ratchet enabling the toothed wheel to rotate without having to unlock the lock, when the carriage is pushed backwards against the thrust of the return springs.

According to a specific configuration, the sliding of the lock to ensure its unlocking is driven by a control handle acting on the lock against resilient return means tending to engage the lock with the teeth of the toothed wheel. Preferentially, the control handle is hinged at the front of the carriage. This configuration enables to ease the unlocking manipulation, while simplifying the forming of the device, the control handle directly acting on the lock.

According to another specific configuration, the toothed wheel and the lock are arranged under the carriage, between the carriage and a guide plate placed on the frame, the guide plate comprising an element of the middle guide rail and the lateral grooves for guiding the carriage edges. This arrangement especially enables to pre-assemble the device, and to ease its subsequent installation on the frame, while protecting the mechanical locking elements housed between the carriage and said plate.

In a motor-driven adjustment version, the device comprises a motor driving the toothed wheel in rotation.

The motor is preferentially attached under the frame and drives the toothed wheel via a flexible drive running through a port made in said frame.

According to another specific embodiment, the device comprises pins attached to the seat nose plate and extending downwards from said plate, each pin comprising a lower end portion arranged to engage under a rib attached to the seating frame, permanently during the sliding of the carriage. Thus, if the plate is submitted to lifting loads, these loads are directly transmitted to the seating frame, via the pins and said ribs, and thus without for the carriage itself to have to withstand such loads. This is particularly advantageous when the seat nose is placed in forward position. Indeed, as will be better seen hereafter, the load then exerted by the user on the front of the seat nose may generate a significant torque thereon, while the carriage is only maintained in its guide means over a short length. A significant load on the means for guiding the carriage edges would result from this situation, which would be particularly prejudicial if these parts are made of plastic. The previously-mentioned embodiment avoids this problem by transmitting this load almost directly from the plate to the seating frame. Further, for this purpose, the pins are arranged on the plate, by being preferably welded thereto, to be immediately next to the means for attaching the rib to the frame in end positions of the carriage sliding travel, since the carriage is most currently in these end sliding positions, and the previously-mentioned load may be the strongest in the forward end position.

Preferentially still, the rib forms a branch of a T guide rail having its other branch forming the lateral rib intended to guide the carriage edges, and the T guide rail is fastened to the frame by bolts having their head embedded in the transverse bar of the T. Thus, especially in the forward end sliding position, the heads of the pins attached to the plate are substantially in correspondence with the bolt heads and the loads tending to lift the plate are then almost directly borne by said bolts, and thus by the frame.

The present invention also aims at a motor vehicle seat having a seat base of adjustable length, characterized in that it comprises a device for adjusting the seat base length such as defined hereabove.

The foregoing and other objects, features, and advantages of the present invention will be discussed in detail in the following non-limiting description of two embodiments of a device for adjusting the seat base length of a motor vehicle seat according to the present invention.

BRIEF DESCRIPTION OF THE DRAWINGS

Reference will be made to the appended drawings, among which:

FIG. 3 is a similar view, the central portion of the carriage being cut away, when the carriage is in a backward position, with a detail of the lock sliding drive, FIG. 4 is a half cross-section view along line IV-IV of FIG. 3.

DETAILED DESCRIPTION

Figure 1:
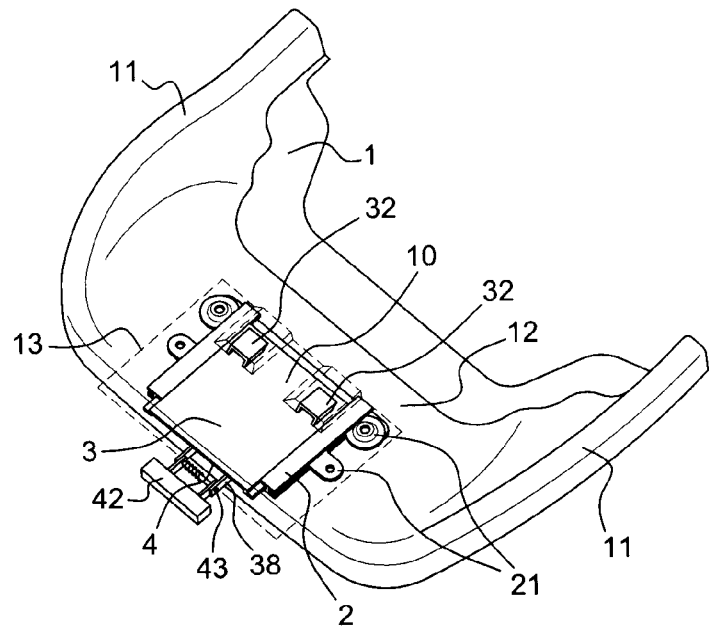
FIG. 1 is a perspective view of the seating frame provided with the manually-operated adjustment device.

FIG. 1 shows seating frame 1, typically made of dished plate, having two edges 11 intended to support the lateral stuffing of the seat cushion, not shown, and a crosspiece 12 connecting these edges, and supporting the central portion of the cushion. Plate 13 supporting the seat nose is schematically shown in this view by dotted lines, and fastened to adjustment device 10, which is itself fastened to crosspiece 12.

Figure 2:
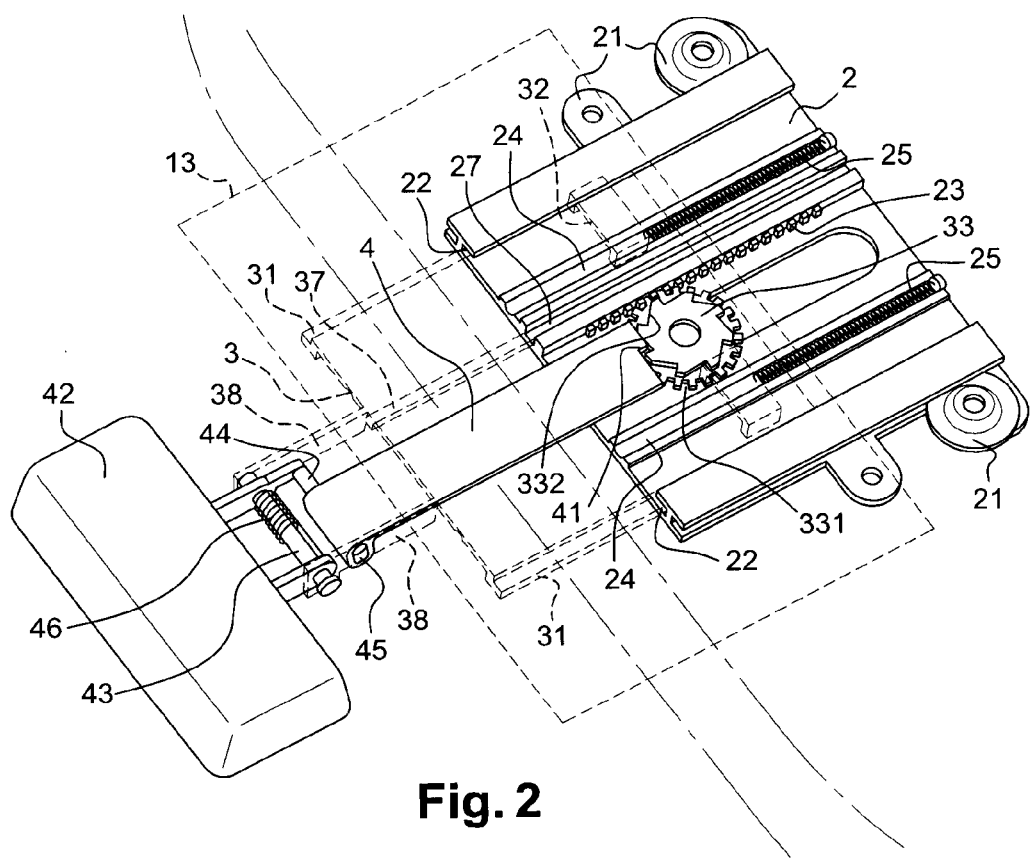
FIG. 2 is a view of the device at larger scale, in a forward position of the seat nose, the carriage being shown by its contour only, to better show the guiding and locking system.

The adjustment device, which can be better seen in FIGS. 2 and 3, comprises:
a guide plate 2
a carriage 3
a lock 4

Guide plate 2 comprises lugs 21 for attaching it to crosspiece 12.

Carriage 3 is guided in translation on guide plate 2 by a guide rail located in a middle area, formed by a rib 37 formed on the bottom surface of the carriage and sliding in a groove 27 made in guide plate 2. Guide plate 2 also comprises two parallel grooves 22 in which lateral edges 31 of carriage 3 are slidably inserted, with a clearance in the horizontal plane, visible in FIG. 4. Grooves 22 are only used to maintain the carriage in the vertical direction against guide plate 2.

Guide plate 2 also comprises, in its central portion between grooves 22 immediately next to groove 27, a rack 23 extending along the sliding direction.

Guide plate 2 also comprises two housings 24 of partially cylindrical cross-section, extending parallel to the sliding direction and intended to receive compression springs 25 used to push back the carriage towards the front of the seat.

Springs 25 are held in their housings 24 between the guide plate and the carriage, bearing against stops respectively attached to the carriage and to the guide plate.

Carriage 3 comprises on its upper surface housings 32 for the fastening of plate 13, for example, by insertion and clenching in the housings of lugs provided on plate 13.

A toothed wheel 33 is clenched on a pivot 34 attached to the carriage, extending downwards perpendicularly to the general plane of the carriage. Toothed wheel 33 comprises first teeth 331 which mesh with rack 23 when the carriage slides in the guide rail and second asymmetrical teeth 332, such as in a ratchet wheel.

Lock 4 is slidably assembled on carriage 3, and guided to slide along the sliding direction of the carriage by a guide rail element 35 formed on the lower surface of the carriage and substantially aligned with the rotation axis of toothed wheel 33. It comprises at its rear end a locking notch 41 having a shape adapted to engage with the second teeth 332 of toothed wheel 33.

A control handle 42 is pivotally assembled to the front of carriage 3 along a horizontal axis 43 supported at the end of two arms 38 extending from the carriage. The handle further comprises a stud 44 which engages into an oblong bore 45 formed at the front end of lock 4, so that an upward rotation of the handle around its axis 43 causes a longitudinal forward motion of lock 4, to unlock toothed wheel 33. A spring 46 placed on axis 43 pulls back handle 42 and thus pulls lock 4 back to its locked position, notch 41 being in mesh with teeth 332 of toothed wheel 33.

The device may be pre-assembled by engaging carriage 3 provided with toothed wheel 33 and with lock 4 into grooves 22 and 27 of guide plate 2 after having placed return springs 25 inside of it, a stop, not shown, preventing the carriage from coming out of the guide rail. For the assembly on the seat base, preassembled device 10 just has to be attached by screwing or riveting of lugs 21 on frame crosspiece 12. When the seat base is being upholstered, plate 13 of the pre-upholstered seat nose is positioned on the carriage and clenched into housings 32 of carriage 3 provided for this purpose, this final assembly operation thus requiring no tool.

The use of the device will be easily deduced from the foregoing. After unlocking by upward pulling of handle 42, the seat nose may be pushed backwards, against the thrust of springs 25. As soon as the handle is released, end notch 41 of lock 4 engages with toothed wheel 33, which blocks its rotation and thus maintains the seat nose in position. It should be noted that, to decrease the length of the seat base, due to the ratchet effect between lock 4 and teeth 332 of the toothed wheel, it may also be sufficient to push the seat nose backwards without necessarily actuating the unlocking handle. To increase the seat base length, it is necessary to unlock the device before letting it slide forward under the effect of the return springs all the way to the desired position, where it will be blocked as soon as the unlocking control handle is released.

Figure 5:
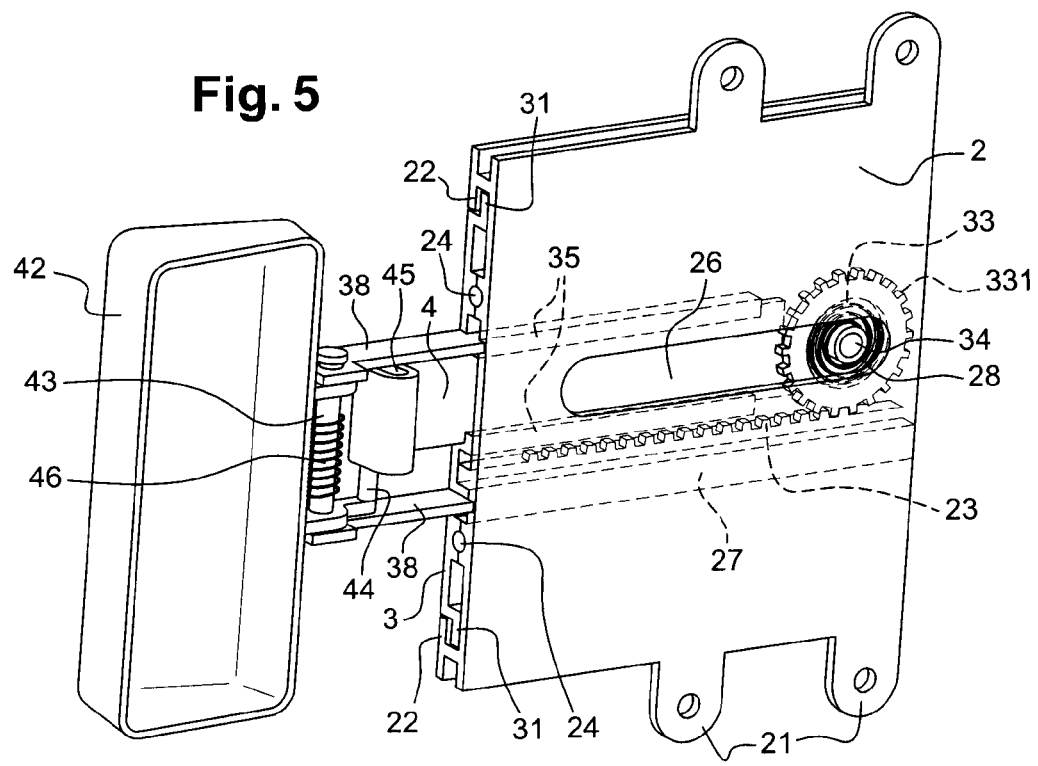
FIG. 5 is a bottom perspective view of the pre-assembled device.
Figure 6:
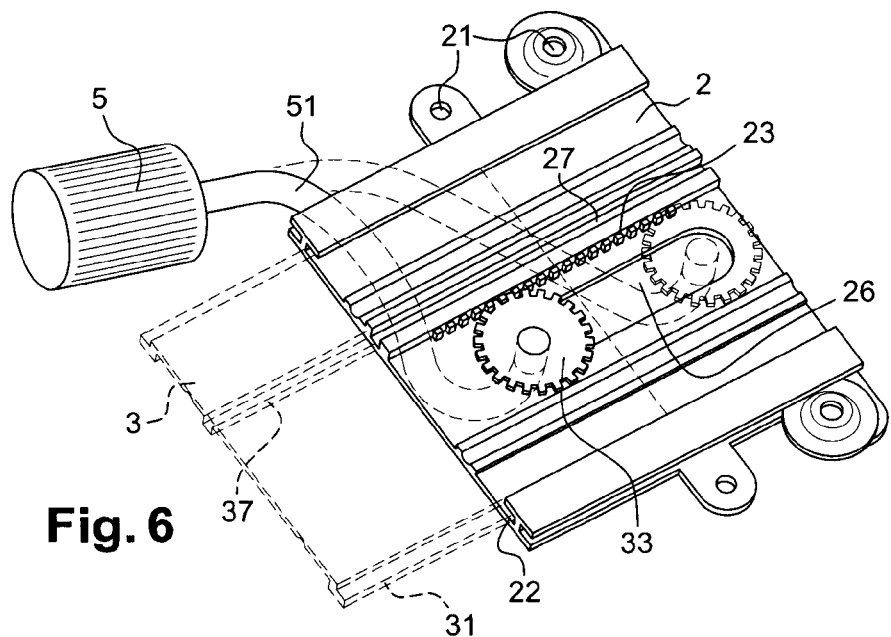
FIG. 6 is a perspective view of the adjustment device, in the case of the motor-driven version.

In the version shown in FIG. 5, the sliding of the carriage is controlled by an electric gear motor 5, attached under crosspiece 12, and driving toothed wheel 33 in rotation by means of a flexible connection 51 connecting the motor to the wheel and running through a port 26 formed in guide plate 2 and also, correspondingly, in the frame crosspiece, to enable the flexible drive to follow the motion of the carriage, as schematically shown in FIG. 5. Guide plate 2 and carriage 4 are similar to the previously-described version. The holding of the carriage in position may result from the sole stopping of gear motor 5, or may be achieved by a lock as in the previously-described manual version, the motor control being then coupled with the lock unlocking control.

Figure 7:
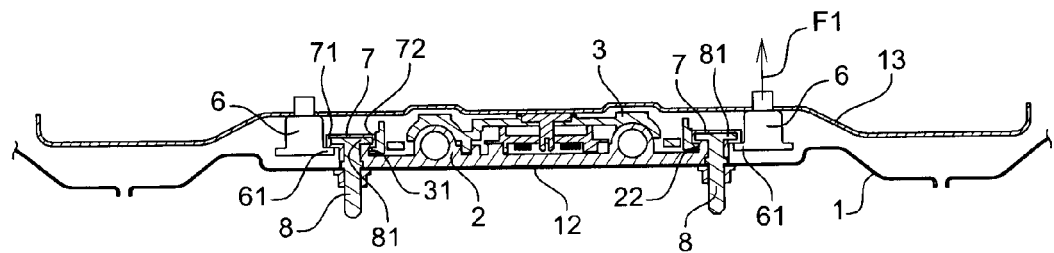
FIG. 7 is a transverse cross-section view of the device in the embodiment comprising pins attached to the plate.
Figure 8:
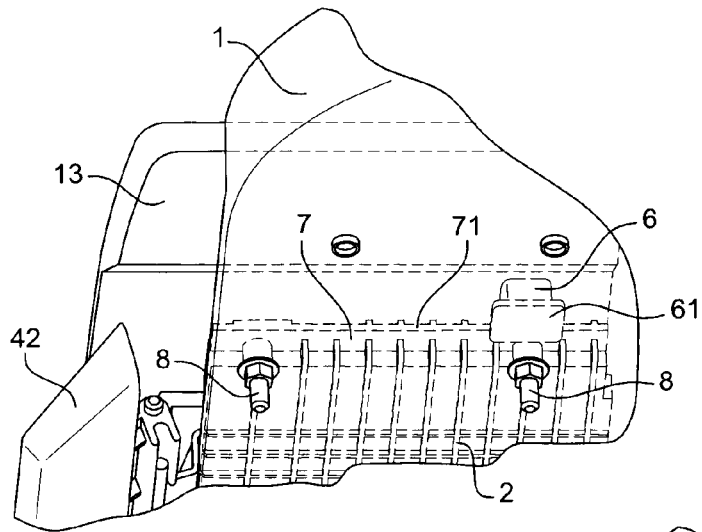
FIGS. 8 and 9 are bottom perspective views of this embodiment, in the back and front end sliding positions, respectively.
Figure 9:
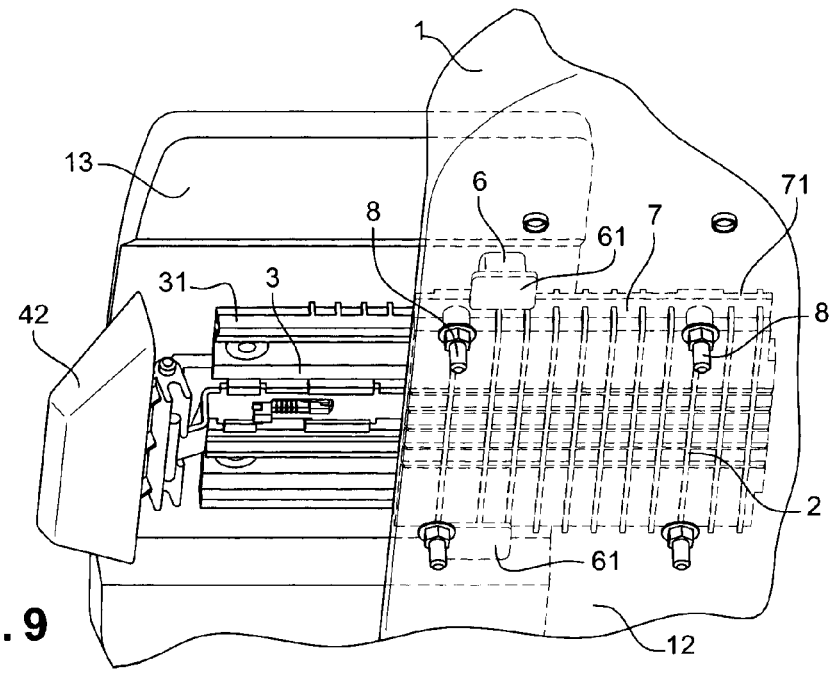

In the embodiment illustrated in FIGS. 7 to 9, two pins 6 are attached on plate 13, for example by welding, and extend downwards from said plate. The pins comprise a lower portion forming a head 61 which is engaged under a rib 71 forming a branch of a guide rail 7 of T-shaped cross-section, the other branch 72 of this T determining, under it, one of parallel grooves 22 in which lateral edges 31 of carriage 3 are slidably inserted.

T-shaped guide rails 7 form the lateral edges of guide plate 2 and are attached to frame crosspiece 12 by four bolts 8 having their head 81 embedded in the transverse bar of the T, as shown in FIG. 7.

Pins 6 are located towards the back of plate 13, to be immediately next to bolts 8 in the sliding end positions of the carriage, as can be seen in FIGS. 8 and 9. In particular, when the seat nose is moved forward, as illustrated in FIG. 9, pins 6 are close to the forwardmost bolts 8, so that heads 61 of the pins are engaged under a portion of rib 71 close to head 81 of said bolts. It can thus be seen that forces F1 tending to lift the back of the plate, under the effect of the tilting torque appearing when the seat nose is moved forward, are almost directly transmitted via head 61 of the pin to head 81 of the bolt, and from there to frame crosspiece 12, while avoiding to create a significant load on edges 31 of the carriage in grooves 22 of the guide plate.

As compared with above-mentioned document DE-A-102004030363, the described embodiments provide a specific positioning of the guide rail and of the rack to avoid buttressing risks. In this document, the guide rail is not positioned in a middle portion and the rack is not positioned close to the guide rail. Further, there is no lock acting on the toothed wheel since the motor ensures the rotation of the pinion.

The present invention is not limited to the above-described embodiment, which has been described as an example only.

In particular, springs 25 for pulling back the carriage to the forward position may be replaced with a spiral spring 28 assembled between toothed wheel 33 and pivot 34, as can be seen in FIG. 5, said spiral spring exerting on the toothed wheel a torque tending to rotate the wheel in a direction causing a forward displacement of the carriage by meshing with rack 23.

The lock may also directly act upon the teeth of the toothed wheel which meshes with the rack.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A device for adjusting seat base length for a motor vehicle seat comprising a seat nose plate and a seating frame, the seat nose plate adjustable relative to the seating frame along a sliding direction, comprising
a carriage, configured to support the seat nose plate, movable with respect to the seating frame and comprising lateral edges parallel to the sliding direction, a guiding rib parallel to the sliding direction and between the lateral edges along an underside of the carriage, and a toothed wheel rotatably assembled on the underside of the carriage on an axis perpendicular to the seating frame and to the sliding direction;
a guide plate for slidably supporting the carriage and configured for mounting on top of the seating frame, comprising a guiding groove configured to engage the guiding rib, lateral grooves configured to engage the lateral edges with a clearance in the horizontal plane, and a rack arranged adjacent the guiding groove to mesh with the toothed wheel; and
means for maintaining the carriage in position with respect to said frame.

2. The device of claim 1, comprising return springs arranged between the carriage and the guide plate on either side of the rack, to push the carriage towards a front of the seat base.

3. The device of claim 1, comprising a spiral return spring assembled between the toothed wheel and the carriage, to exert on the toothed wheel a torque capable of pushing the carriage towards a front of the seat base by meshing of the toothed wheel with the rack.

4. The device of claim 1, wherein the means for maintaining the carriage in position comprises a lock acting on the rotation of the wheel.

5. The device of claim 4, wherein the lock is slidably assembled on the carriage in the sliding direction of the carriage and has a notched locking end cooperating with teeth of the toothed wheel.

6. The device of claim 5, wherein the teeth of the toothed wheel cooperating with the end of the lock are specific teeth different from the teeth cooperating with the rack.

7. The device of claim 5, wherein the sliding of the lock is controlled by a control handle acting on the lock against resilient return means tending to engage the lock with the teeth of the toothed wheel.

8. The device of claim 4, wherein the lock is slidably assembled on the carriage in the sliding direction of the carriage and has a notched locking end cooperating with teeth of the toothed wheel, and wherein the toothed wheel and the lock are arranged under the carriage, between the carriage and the guide plate.

9. The device of claim 1, comprising a motor driving the toothed wheel in rotation.

10. The device of claim 9, wherein the motor is attached under the seating frame and drives the toothed wheel via a flexible drive running through a port made in said seating frame.

11. The device of claim 1, comprising pins attached to the seat nose plate and extending downwards from said plate, each pin comprising a lower end portion arranged to engage under a rib attached to the seating frame, permanently during the sliding of the carriage.

12. The device of claim 11, wherein the pins are arranged on the plate to be immediately next to a means for attaching the rib to the frame in end positions of the sliding of the carriage.

13. The device of claim 11, wherein the pins are welded on the plate.

14. The device of claim 11, wherein the rib forms a branch of a T-shaped guide rail having its other branch forming a lateral rib for vertically guiding the carriage edges.

15. The device of claim 14, wherein the T-shaped guide rail is attached to the frame by bolts having their head embedded in the transverse bar of the T.

16. A motor vehicle seat having a seat base of adjustable length, comprising the seat base length adjustment device as in any of the preceding claims.

17. The device of claim 1, wherein the guiding rib and guiding groove cooperate as a guide rail having a narrow width relative to a longitudinal length of the guide rail.

* * * * *